(12) United States Patent
Parker et al.

(10) Patent No.: US 12,435,303 B2
(45) Date of Patent: Oct. 7, 2025

(54) CONTINUOUS FLOW REACTOR FOR LOW pH VIRAL INACTIVATION

(71) Applicant: Boehringer Ingelheim International GmbH, Ingelheim am Rhein (DE)

(72) Inventors: Stephanie Parker, Rialto, CA (US); Cameron Lee Bardliving, Claremont, CA (US); Jonathan Coffman, Gaithersbury, CA (US); Scott Godfrey, Pleasanton, CA (US); Raquel Orozco, Richmond, CA (US)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 1113 days.

(21) Appl. No.: 17/283,281

(22) PCT Filed: Oct. 7, 2019

(86) PCT No.: PCT/US2019/054959
§ 371 (c)(1),
(2) Date: Apr. 7, 2021

(87) PCT Pub. No.: WO2020/076681
PCT Pub. Date: Apr. 16, 2020

(65) Prior Publication Data
US 2021/0380914 A1    Dec. 9, 2021

Related U.S. Application Data

(60) Provisional application No. 62/742,534, filed on Oct. 8, 2018.

(51) Int. Cl.
*C12M 1/12* (2006.01)
*C12M 1/00* (2006.01)
*C12N 7/00* (2006.01)

(52) U.S. Cl.
CPC ............ *C12M 23/06* (2013.01); *C12M 47/12* (2013.01); *C12N 7/00* (2013.01)

(58) Field of Classification Search
CPC ............................. C12M 23/06; C12M 47/12
(Continued)

(56) References Cited

U.S. PATENT DOCUMENTS 6,399,031 B1 *  6/2002  Herrmann ................. F28D 7/08
                                                                  165/184
11,725,191 B2   8/2023  Coffman et al.
(Continued)

FOREIGN PATENT DOCUMENTS

WO    2016173982 A1    11/2016
WO    2017156355 A1    9/2017

OTHER PUBLICATIONS

International Search Report and Written Opinion for corrsponding application, PCT/US2019/054959, date of mailing Jan. 2, 2020.
(Continued)

*Primary Examiner* — Michael L Hobbs
*Assistant Examiner* — Lenora A Abel
(74) *Attorney, Agent, or Firm* — Shelley A. Jones (57) ABSTRACT

A viral inactivation device including at least one continuous viral inactivation reactor having an inlet, an outlet, and a tubular flow path. The tubular flow path includes a set of alternating turns that form a serpentine pattern between the inlet and the outlet.

10 Claims, 8 Drawing Sheets

(58) Field of Classification Search
USPC .................................................. 435/308.1
See application file for complete search history.

(56) References Cited

U.S. PATENT DOCUMENTS

| | | | |
|---|---|---|---|
| 2016/0375159 A1* | 12/2016 | Lobedann | A61L 2/10 |
| | | | 422/28 |
| 2017/0326520 A1 | 11/2017 | Roberge et al. | |
| 2021/0388323 A1* | 12/2021 | Brown | C12N 7/08 |
| 2023/0064241 A1 | 3/2023 | Coton et al. | |

OTHER PUBLICATIONS

Orozcp et.al., "Design construction, and optimization of a novel, modular, and scalable incubation chamber for continuous viral inactivation", 2017, Biotechnology Progress, 2017, vol. 33, No. 4, pp. 954-965.

Parker et.al., "Design of a novel continuous flow reactor for low pH viral inactivation", Biotechnology and Bioengineering, 2018, vol. 115, No. 3, pp. 606-616.

* cited by examiner

CONTINUOUS FLOW REACTOR FOR LOW pH VIRAL INACTIVATION

FIELD OF THE INVENTION

The present disclosure generally relates to an apparatus and a process for a novel reactor. More particularly, the present disclosure relates to an apparatus and a process for continuous flow reactor for low pH viral inactivation.

BACKGROUND OF THE INVENTION

The invention lies on the field of production of biological products like proteins which usually takes place in a bioreactor (fermenter) where e.g. eukaryotic cells are cultivated to produce a protein of interest. Different technologies are established therefore, e.g. fed-batch or continuous or perfusion fermentation. Before use the product needs to be purified. Among the purification steps inactivation of viruses is mandatory, especially when the product is intended for use in humans.

Presently, virus inactivation at a low pH is performed in a batch reactor. The material to be inactivated (i.e., a liquid which potentially contains the active viruses) is introduced into a batch reactor. The material to be inactivated is brought to a pH of ≤4 by an acidic solution and allowed to stand for the required time. The inactivation of the viruses is effected by contact of the viruses with the acidic solution for a particular product- and process-dependent time. The entire content of the batch reactor experiences inactivation with a virtually identical residence time. Additionally, the virus reduction achieved in each batch is virtually identical.

SUMMARY OF THE INVENTION

In an aspect, a viral inactivation device is provided. The viral inactivation device includes at least one continuous viral inactivation reactor including an inlet, an outlet, and a tubular flow path comprising a set of alternating turns that form a serpentine pattern between the inlet and the outlet.

In an aspect, the at least one continuous viral inactivation reactor is an in-line tubular continuous viral inactivation reactor.

In another aspect, the set of alternating turns comprises at least two alternating turns having an angle of from about 270° to about 280°.

In a further aspect, the set of alternating turns comprises from about 2 to about 325 or more alternating turns having an angle of from about 270° to about 280°.

In yet another aspect, the tubular flow path includes a diameter of from about 0.6 cm to about 0.7 cm.

In an aspect, the set of alternating turns are segmented vertically into at least two stacked layers.

In a further aspect, each of the at least two stacked layers comprises 12.5 alternating turns in a single plane, wherein each of the alternating turns includes an angle of from about 270° to about 280°.

In an aspect, each of the at least two stacked layers include a thickness of from about 0.7 cm to about 1.2 cm.

In an aspect, each of the at least two stacked layers is connected to one another via a 180° turn of the tubular flow path.

In another aspect, the at least two stacked layers are 26 layers connected to one another via 25 180° turns of the tubular flow path.

In a further aspect, the at least one continuous viral inactivation reactor comprises from about 2 to about 6 viral inactivation reactors connected in series.

In yet another aspect, the set of alternating turns generate a vortex to induce mixing a product stream having a laminar flow with a Reynolds Number of from about 187.7 to about 375.5.

In an aspect, the tubular flow path includes dimensions such that a product stream is in the continuous viral inactivation reactor for at least 30 minutes.

In another aspect, the viral inactivation device includes a low pH continuous viral inactivation reactor having an inlet in fluid communication with a first static mixer and an outlet in fluid communication with a second static mixer; wherein the low pH continuous viral inactivation reactor includes a tube formed of a set of alternating turns.

In a further aspect, the tube includes dimensions such that a product stream is in the low pH continuous viral inactivation reactor for at least 30 minutes.

In yet another aspect, each turn in the set of alternating turns comprises an angle of from about 270° to about 280°.

In an aspect, the set of alternating turns includes a radius of curvature of from about 0.85 cm to about 2 cm.

In another aspect, the tube includes 325 alternating turns.

In a further aspect, the tube is segmented into 26 vertical layers connected to one another by 25 tubular flow paths, each having a 180° turn.

In yet another aspect, the tube comprises at least 12.5 alternating turns in a single plane.

In an aspect, the low pH continuous viral inactivation reactor comprises from about 2 to about 6 viral inactivation reactor connected in series.

In another aspect, a process for a continuous low pH viral inactivation of a product stream comprising introducing the product stream to a first static mixer to lower its pH to a predetermined viral inactivation pH; introducing the product stream to be inactivated exiting the first static mixer into an inlet of a tube having a set of turns in a single plane; flowing the product stream through the tube under virus-inactivating conditions; and exiting the product stream from the tube through an outlet of the tube; wherein to lower the pH of the product stream, a low pH buffer is introduced to a first static mixer.

In a further aspect, the turns in a single plane form a serpentine pattern.

In an aspect, the product stream is introduced to a first static mixer from a protein A capture.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings.

Viral safety is mandated for protein therapeutics produced in mammalian cells and viral clearance procedures are highly regulated. Low pH VI is a highly effective method used in monoclonal antibody purification processes, consistently clearing greater than 4 log(10) of large enveloped viruses, including endogenous retroviruses. The American Society for Testing and Materials (ASTM) Standard Practice for Process for Inactivation of Retrovirus by pH prescribes the following conditions for low pH viral inactivation: pH≤3.6, at ≥15° C., for ≥30 min in a system specific buffer at the specified pH, providing ≥5 log reduction value (LRV).

Figure 1:
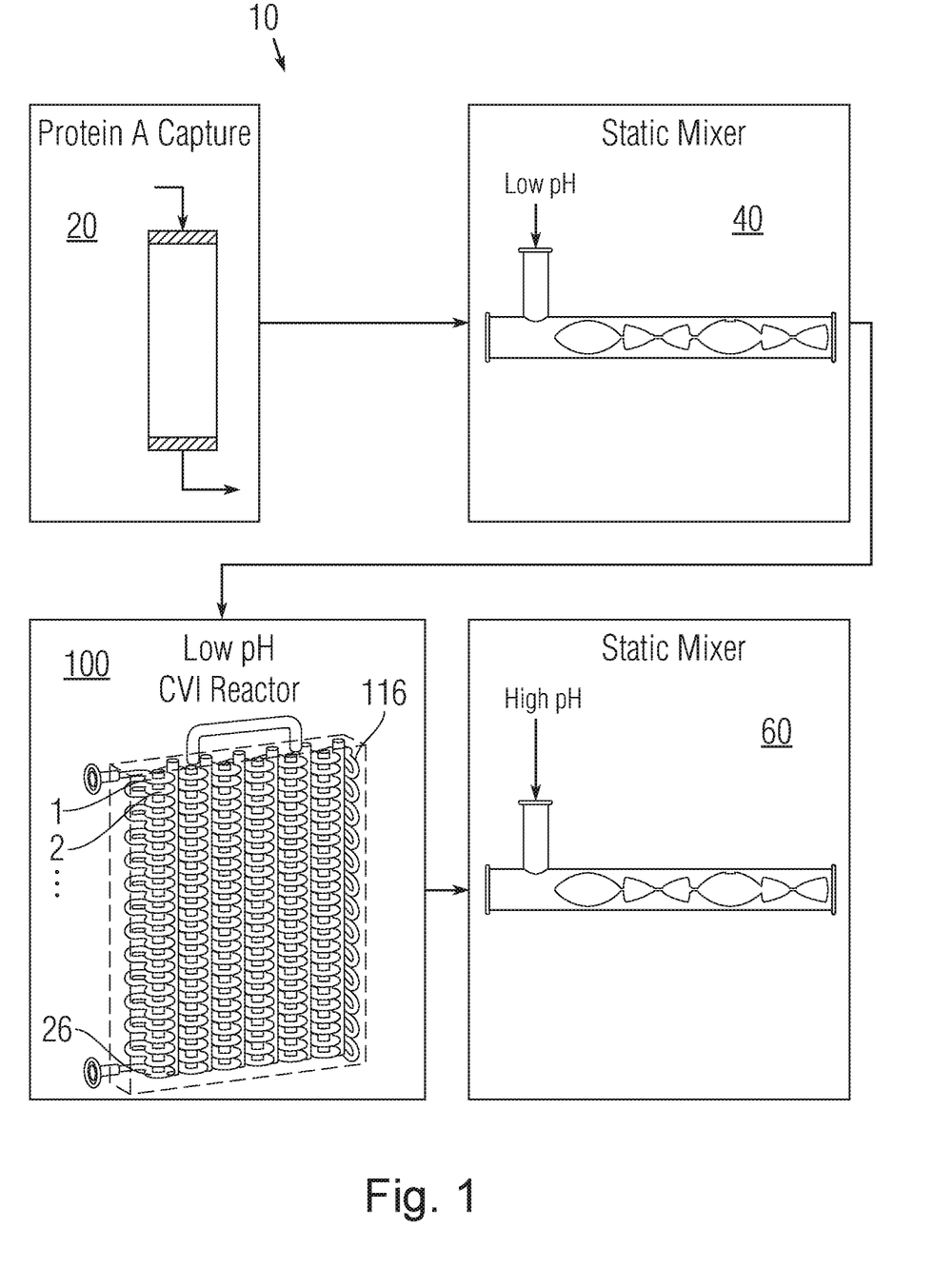
FIG. 1; illustrates an overall continuous low pH viral inactivation scheme, according to an example of the present disclosure.

The continuous flow reactor according to the invention can be made of any appropriate inert material, e.g. glass, synthetic material or metal. FIG. 1 illustrates an exemplary continuous viral inactivation (CVI) process system 10. The CVI process system 10 is advantageous because it can include steady-state operation, process flexibility, reduction in the ratio of equipment size to production capacity, streamlined process control, improved product quality control, and reduced capital costs. To this end, the process system 10 can include a capture, such as a Protein A Capture 20, a first static mixer 40, a second static mixer 60, and a continuous flow reactor, such as an in-line tubular CVI reactor (jig in a box (JIB)) 100 positioned between the first static mixer 40 and the second static mixer 60. A continuous flow of a product stream to be inactivated from protein A capture elution can pass through the first static mixer 40 to adjust the pH of the protein A capture elute to a predetermined viral inactivation pH. This can be accomplished by mixing the protein A capture elute with a low pH buffer. The protein A capture elute having an adjusted pH can be introduced to the in-line tubular CVI reactor 100 and finally to the second static mixer 60 for a pH adjustment before moving to further downstream processing steps.

Although FIG. 1 illustrates a CVI process system where Protein A capture is used as an input process stream to the in-line tubular CVI reactor 100, any process stream can be used as an input process stream to the in-line tubular CVI reactor 100. Such process streams can include, but are not limited to, a bioreactor effluent, an anion exchange chromatography effluent, a cation exchange chromatography effluent, an effluent from an aqueous two-phase extraction, an effluent from a precipitation reaction, an effluent from a membrane filtration step, and an effluent from an ultrafiltration step.

In an example, the in-line tubular CVI reactor 100 can be configured to or designed to minimize and/or reduce pressure drop and axial dispersion. Accordingly, the in-line tubular CVI reactor 100 can operate in low Reynolds (Re) number, which is defined as a flow having a Re number of less than 2000 and defined as Re=ρvd/μ, where ρ is density, v is average velocity, d is the tube diameter, and μ is dynamic viscosity. For example, the calculation of Re number can be based on a product stream having a temperature of 25° C., ρ=1000 kg m$^{-3}$ and μ=8.9E-4 Pa·s. However, laminar flow can cause axial dispersion, as it is characterized by a parabolic velocity profile, where fluid elements at the center of the tube travel faster than the elements near the wall, resulting in a broad Residence Time Distribution (RTD). As shown in FIG. 2B, to reduce and/or at least partially eliminate axial dispersion, the in-line tubular CVI reactor 100 can include a flow path, such as tubular flow path 112 having at least one turn or curve 110 to produce secondary flows that enhance radial mixing and reduce axial dispersion.

A radius of curvature (ROC) of the turn or curve 110 can be determined as a function of the Dean Number (D) and the ratio of the turn length to length of a toric geometry ($L_{DT}$), wherein D=Re√(d/2R), were d is the tube inner diameter and R is the radius of curvature of the flow path, and wherein $L_{DT}=0.322 \times d_c^{0.31} \times Re^{0.59} \times d_i^{0.76}$, where $d_i$ is the internal diameter and $d_c$ is the coil diameter in meters.

FIGS. 2A-2D illustrate an exemplary in-line tubular CVI reactor 100 that can operate at low Re. The in-line tubular CVI reactor 100 can include the tubular flow path 112 that includes turns or curves 110. The turns or curves 110 are arranged such that the direction of curvature from one turn to the next changes and/or shifts to enhance radial mixing and reduce axial dispersion. Furthermore, in an example, the tubular flow path 112 can include dimensions (i.e., the relationship between the diameter, length, and pressure), such that a product stream is in the CVI reactor for at least 30 minutes.

Referring to FIGS. 2A-2E, the inner diameter D of the tubular flow path 112 can be from about 0.5 cm or less to about 1 cm or more, for example from about 0.6 cm to about 0.7 cm, such as a diameter of about 0.635 cm. This size tube can allow a volumetric flow rate (Q) of from about 10 ml/min (Re 37.5) or less to about 200 ml/min (Re 750.9) or more, such as from about 50 ml/min to about 100 ml/min with a Re number of from about 187 to about 380, such as from about 187.7 to about 375.5. In an example, the flow path 112 in the in-line tubular CVI reactor 100 can include a serpentine pattern. This serpentine pattern can be created by the tubular flow path 112 having from about 2 turns to about 2000 turns or more of alternating turns, such as about 100 to about 500 turns, or 200 to about 400 turns, for example, about 325 turns, which can have an angle of from about 265° to about 280°, such as about 270°. In an example, the first turn can include an angle of about 270° and the second turn can include an able of about 278.3°. For example, as shown in FIG. 3, the in-line tubular CVI reactor 100 can include approximately 325 alternating turns with a radius of curvature (ROC) of from about 0.85 cm or less to about 2 cm or more, such as from about 0.85 cm to about 0.99 cm, which can result in a turn length of from about 4 cm or less to about 9.5 cm or more, such as about 4.71 cm. The parameters of the in-line tubular CVI reactor 100 can correspond to a Dean No. of from about 240 to about 145, such as a Dean No. of about 210 or more and an LDT of from about 4.5 cm to about 11 cm, such as from about 6.4 cm to about 8.5 cm, for example an LDT of about 6.76 cm.

Figure 2A:
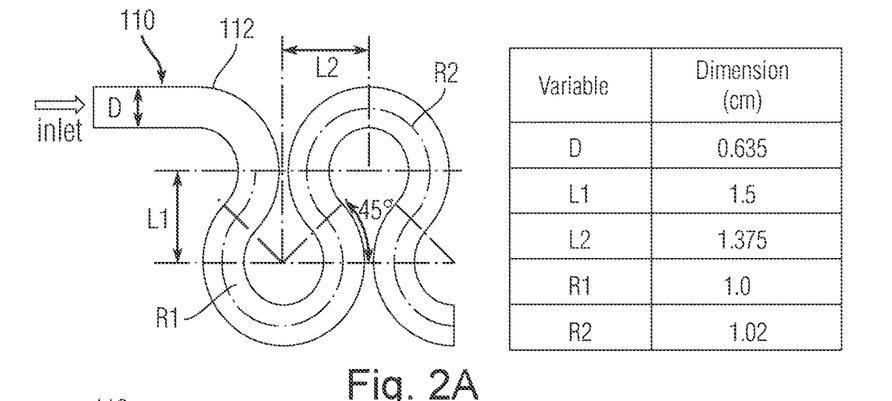
FIG. 2A is a top view of a tubular flow path of a continuous tubular reactor, according to an example of the present disclosure.
Figure 2B:
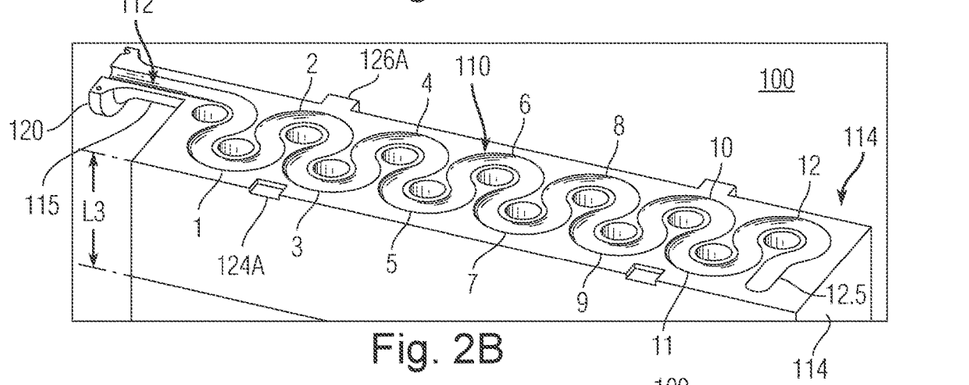
FIG. 2B is a partial perspective view of a continuous tubular reactor, according to an example of the present disclosure.
Figure 3:
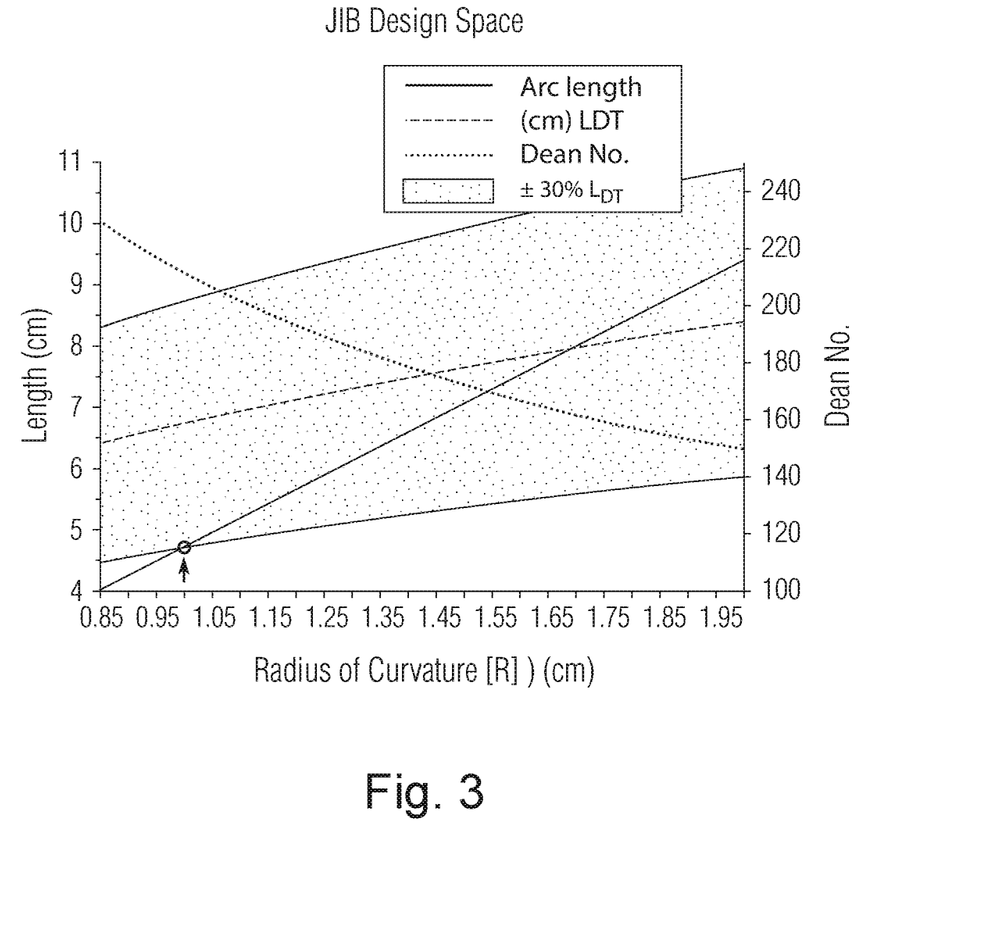
FIG. 3 illustrates the correlation between the radius of curvature vs. the arc length of the continuous tubular reactor having alternating 270° turns, the requisite secondary flow development turn length (LDT), and the characteristic Dean No at a flow rate, according to an example of the present disclosure.

Referring to FIG. 2A, each curve 110 in the tubular flow path 112 can include a vertical (L1) center to center distance between the turns of approximately 1.5 cm, such as about 1.479 cm. Additionally, each curve 110 can include a horizontal (L2) center to center distance between the turns of about 1.375 cm. Furthermore, the radius of each curve 110 in the tubular flow path 112 can be substantially constant. In an example, when the ROC is from about 0.85 cm to about 0.99 cm, then the angle of the curvature in each curve 110 can be about 270°. In another example, the ROC is greater than or equal to about 0.99 cm, then the angle of curvature of each curve can be the same or the angle of the curvature of the first curve 110 can be about 270° and the angle of the curvature of the second curve 110 adjacent to the first curve can be equal or greater than 270°. In each exemplary scenario described, above, R1 and R2 can be within 0.05 cm of each other to prevent substantial differences in the Dean Number between alternating turns.

In an example, each curve 110 in the tubular flow path 112 can include the same radius, such as a radius of 1 cm. In another example, each curve 110 in the tubular flow path 112 can include a different radius. For example, the first curve 110 can include a radius R1, which can be 1 cm and the second curve 110 can include a radius R2, which can be 1.02 cm. In this example, the angle of the curvature corresponding to the radius R1 can be about 270° and the angle of the curvature corresponding to the radius R2 can be about 278.27°. In another example, the first half of a curve 110 in each tubular flow path 112 can include a first radius R1, which can be 1 cm and the second half of the curve 110 in each tubular flow path 112 can include a second radius R2, which can be 1.02 cm.

Figure 2C:
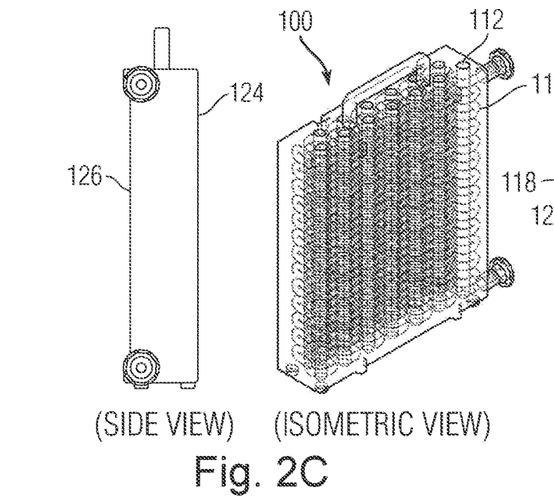
FIG. 2C is a side view and an isometric view of the continuous tubular reactor, according to an example of the present disclosure.

Referring to FIGS. 2B and 2C, to accommodate approximately 325 alternating 270° turns into a compact design, the tubular flow paths 112 in the in-line tubular CVI reactor 100 can be segmented vertically into a plurality of stacked layers 114, such as from about 2 layers 114 to about 50 layers 114 or more, for example, 26 layers 114, as shown in FIGS. 1 and 2C. In an example, each layer 114(a)-114(z) in the stacked layers 114 can include from about 10.5 turns or less to about 15.5 turns or more in a single plane. For example, each layer 114(a)-114(z) in the stacked layers 114 can include 12.5 turns. In an example, each layer 114 can be connected to its adjacent lower layer 114 by a 180° vertical turn 116. Alternatively, a second half of the last turn 110 of the flow path 112 in each layer 114 can be turned vertically by 180° to connect the tubular flow path 112 in the first layer (e.g., layer 114(a) to the tubular flow path 112 in the second layer 114(b)). In an example, where the in-line tubular CVI reactor 100 includes 26 layers 114, the 26 layers 114 can be connected to one another by 25 180° vertical turns 116.

Figure 2D:
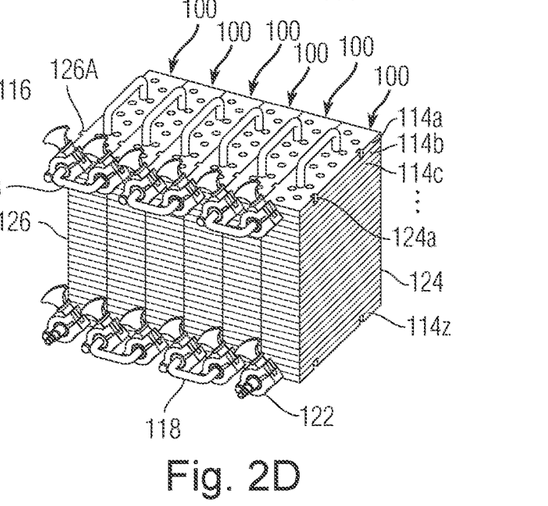
FIG. 2D illustrates a plurality of continuous tubular reactors connected to one another, according to an example of the present disclosure.
Figure 2E:
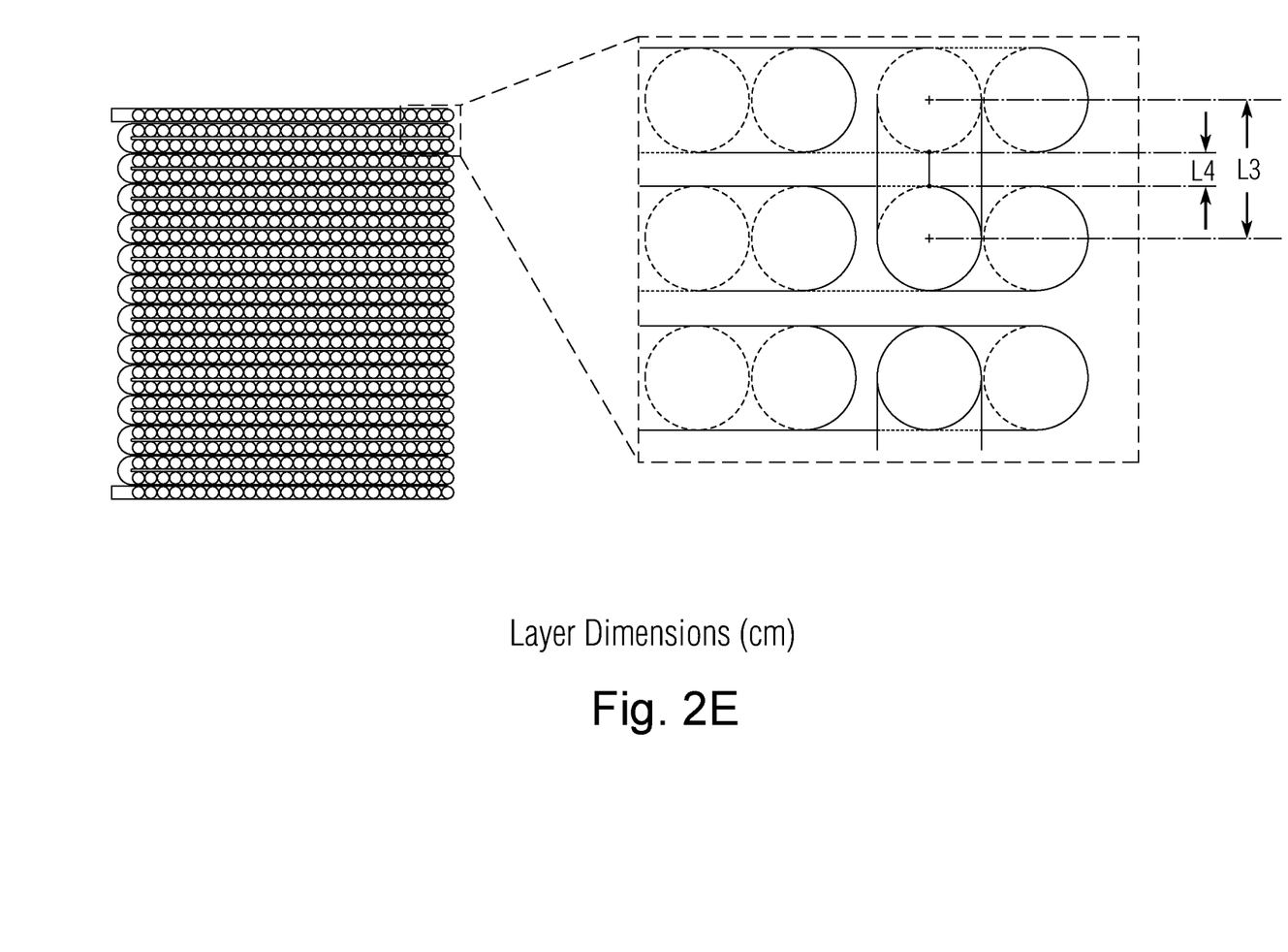
FIG. 2E illustrates layers of the continuous tubular reactor, according to an example of the present disclosure.

Referring to FIG. 2E, in an example, each layer 114 in the in-line tubular CVI reactor 100 can include a depth L3. The depth L3 can be a distance from a center of the tubular flow path 112 in a first layer 114 to the center of the tubular flow path 112 in a second layer 114 directly below the first layer 114. The depth L3 can be from about 0.7 cm or less to about 1.2 cm or more, for example from about 0.8 cm to about 0.9 cm, such as a depth of about 0.835 cm. In an example, the distance (L4) from the bottom portion of the tubular flow path 112 in a first layer to the top portion of the tubular flow path 112 in a second layer directly below the first layer can be from about 0.15 cm (1.5 mm) to about 0.4 cm (4 mm), for example, it can be from about 0.17 cm (1.7 mm) to about 0.255 cm (2.55 mm), such as about 0.2 cm (2 mm).

In an example, as shown in FIG. 2D, to allow for alterations to the path length and incubation time, in addition to the in-line tubular CVI reactor 100 having a plurality of layers 114, a plurality of in-line tubular CVI reactor 100 can be connected to one another in series. This can be accomplished by one or more flanged connectors 118. In an example, at least 2 in-line tubular CVI reactor 100 can be connected to one another, such as at least 6 in-line tubular CVI reactor 100 or more. In this particular example, the tubular flow path 112 at each end of the in-line tubular CVI reactor 100 can partially extend out (extended section 115) from the in-line tubular CVI reactor 100. The extended section 115 can also include a flange 120, as shown in FIG. 2B. A connector 118 can include a horizontal 180° turn and/or be in a shape of a "U." One end of the connector 118 can be connected to the tubular flow path 112 or the flange 120 of a first in-line tubular CVI reactor 100 and the second end of the connector 118 can be connected to the tubular flow path 112 or the flange 120 of an adjacent in-line tubular CVI reactor 100.

The connector 118 can be connected to each tubular flow path 112 or flange 120 by a clamp 122, as shown in FIG. 2D, or by other fastener devices, such as a screw, an adhesive, etc. In an example, a gasket can be placed between the end of the tubular flow path 112 or flange 120 and each end of the connector 118.

In an example, the in-line tubular CVI reactor 100 can include a body or footprint of 20×4.9×23 cm and can contain a flow path 112 length of approximately 16.43 m resulting in approximately a 520 ml flow volume. The body of the in-line tubular CVI reactor 100 can include a first side 124 and a second side 126, as shown in FIG. 2C. In an example, the first side 124 can include at least one groove or indentation 124A and the second side 126 can include at least one protrusion 126A. The at least one indentation 124A and the at least one protrusion 126A can be arranged such that when two in-line tubular CVI reactors 100 are facing one another they are aligned and can removably secure one in-line tubular CVI reactors 100 to an adjacent in-line tubular CVI reactor 100.

EXAMPLE

Pulse tracer experiments with the CVI reactor consisted of first flushing the JIB with Milli-Q water, (Barnstead Nanopure Water Purification System, Thermo Scientific, Waltham, MA), followed by a 13 ml pulse injection of 50 mg/ml Riboflavin, and finally chasing with Milli-Q water via a peristaltic pump (520 IP31, Watson-Marlow Flow Technology Group, Lake Forest, CA). The absorbance of the tracer at the outlet was measured using a FlowVPE (C Technologies. Inc. New Jersey, NY) flow cell unit integrated with a Cary 60 UV-Vis Spectrophotometer (Agilent Technologies, Santa, Clara, CA) at a wavelength of 372 nm. Silicone tubing 0.25" ID (Masterflex 96410-24, Cole-Parmer, Vernon Hills, IL) was used to connect the pump to the reactor and reactor to the Spectrophotometer.

Example 1—Computational Fluid Dynamics

ANSYS Fluent Workbench v. 17.2 species transport model was used to simulate JIB tracer studies. For this work, the SOLIDWORKS CAD geometry of the CVI reactor was directly imported into ANSYS. The CFD geometry was matched with the experimental setup by adding a straight volume of tubing at the entrance and before the measurement point. The 3D flow region was divided into hexahedral dominate finite volumes with higher resolution mesh elements employed at the tube walls, to capture near wall flow physics, using ANSYS MESHING. Specifically, an unstructured grid with inflation along the edge was applied to the outlet face and swept through the rest of the body, using an all quad free face mesh defined by the sweep number of divisions. Investigation of grid independence was performed using a global mesh refinement algorithm based on a 2.5 ratio of maximum change in cell volume, with a range of 1.5-6.5 million elements. Steady-state simulations monitoring pressure drop and outlet velocity were run at each level of grid refinement. Results of mesh independence studies demonstrated that 2.5 million elements were sufficient for further studies.

The computational model was first solved for steady-state with convergence criteria of $1e^{-8}$ residuals for the velocity field. Next, the steady-state velocity field was used to initialize a transient model where a 13 ml volume pulse tracer with a mass diffusivity of $0.8 \times 10^{-9}$ m$^2$ s$^{-1}$ is injected into the reactor. To match the experimental setup, the tracer is contained in 13 ml volume of straight tubing at the start of the simulation, or t=0, the model then simulates the pulse tracer volume traveling through the reactor. A surface monitor at the outlet of the reactor recorded the mass-weighted molar concentration of the tracer at the outlet at each time step. ANSYS Fluent predicts the local mass fraction of each species, $Y_i$, through the solution of a convection-diffusion equation for the ith species using the Convection-diffusion equation below.

$$\frac{\partial}{\partial t}(\rho \gamma_i) + V - (\rho \bar{v} \gamma_i) = -V \cdot \overline{J_i} \qquad (1)$$

In the above equation, $J_i$ is the diffusion flux of species i due to gradients of concentration and v, is the steady-state velocity field. To approximate diffusion due to concentration gradients for mass diffusion in laminar flows, ANSYS Fluent solves the Fick's Law dilute approximation written as:

$$J_i = -\rho D_{i,m} \nabla Y_i \qquad (2)$$

where $D_{i,m}$ is the mass diffusion coefficient for species i in the mixture.

Example Results

Flow Dynamic Results

Figure 4A:
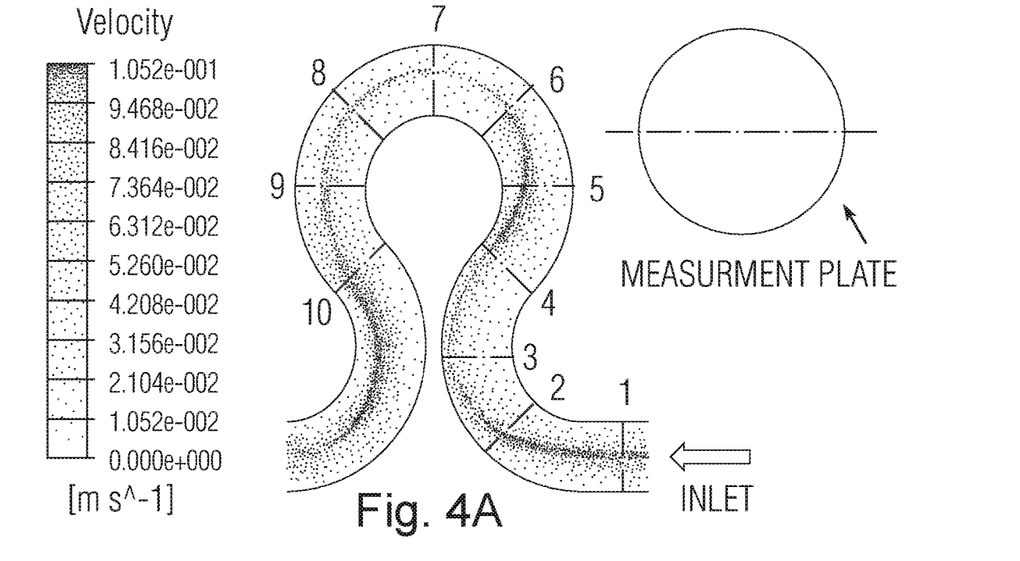
FIGS. 4A and 4B illustrate the computational fluid dynamics results for the center plane velocity contour and profiles for the continuous tubular reactor, according to an example of the present disclosure.

The steady-state flow field of the JIB was computed using ANSYS solver and the flow dynamics of the system were characterized via the center plane velocity profile, cross-sectional velocity profiles, and secondary flow patterns. Characterization of the JIB flow dynamics was used to determine the extent to which the addition of curvature in the flow path disrupts the uniform and highly ordered motion characteristic of the laminar flow regime. The JIB centerline velocity profile was measured at the center plane of the flow path perpendicular to the inlet, as shown in FIG. 4A. FIG. 4A shows the center plane velocity contours for the JIB at a volumetric flow rate of 100 ml/min (linear velocity is 0.0526 m/s and Re is 375.5). As shown in FIG. 4A, the center plane velocity has an oscillating pattern where the region of maximum velocity is continuously shifted toward the outside of the alternating 270° turns due to the generation of secondary flows. The velocity contours show that the location and magnitude of the maximum velocity at the centerline are constantly changing in response to the alternating curvature in the flow path deviating from the characteristic parabolic laminar velocity profile.

Figure 4B:
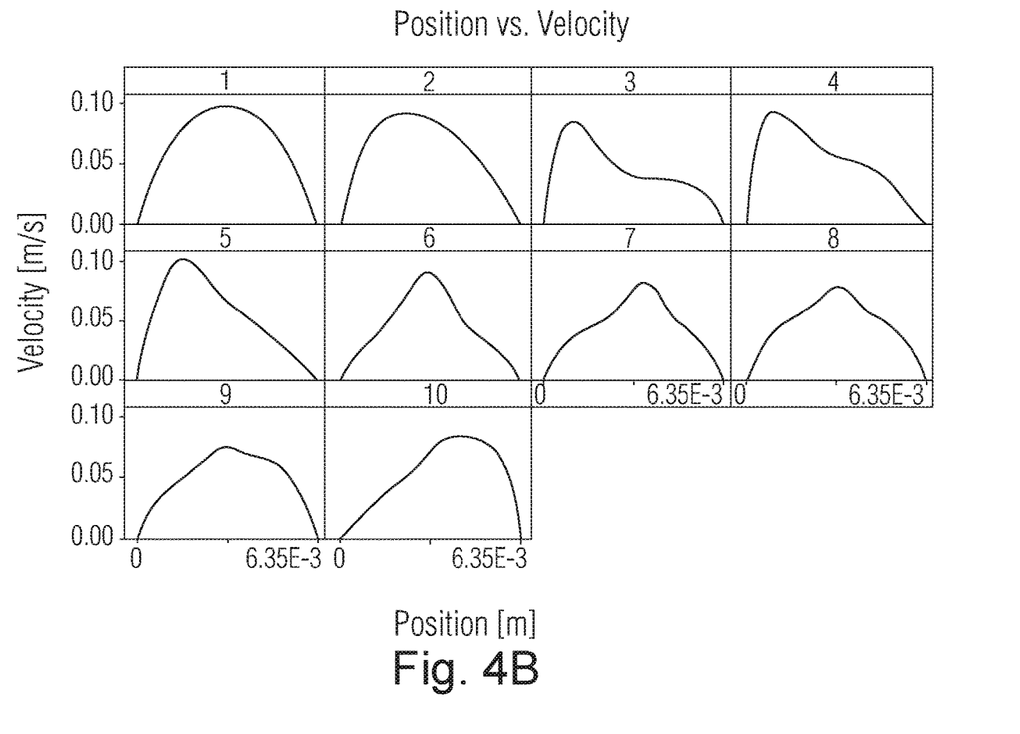

In FIG. 4B, the magnitude of the velocity profile is plotted at 0.758 cm intervals of the 270° turns. At the inlet, where the flow path is straight, the velocity profile is the characteristic laminar flow parabolic profile where centerline velocity is 0.1052 m/s or twice the average of 0.0526 m/s, FIG. 4B position 1. As previously shown in the velocity contours in FIGS. 4A and 4B graphically show that the location of maximum velocity at the center plane shifts from left to right, moving toward the outer wall of the turns. The intervals plotted in FIG. 4B further graphically show that the magnitude of the maximum velocity at the center plane is reduced, when compared to the characteristic value 0.1052 m/s, and is as low as 0.076 m/s or 27.8% lower, as shown in position 9 in FIG. 4A. Therefore, despite operating in the laminar flow regime, Re 375.5, the alternating 270° turns with ROC of 1 cm successfully disrupted the characteristic parabolic laminar flow velocity profile and reduced the magnitude of the maximum centerline velocity.

Figure 5:
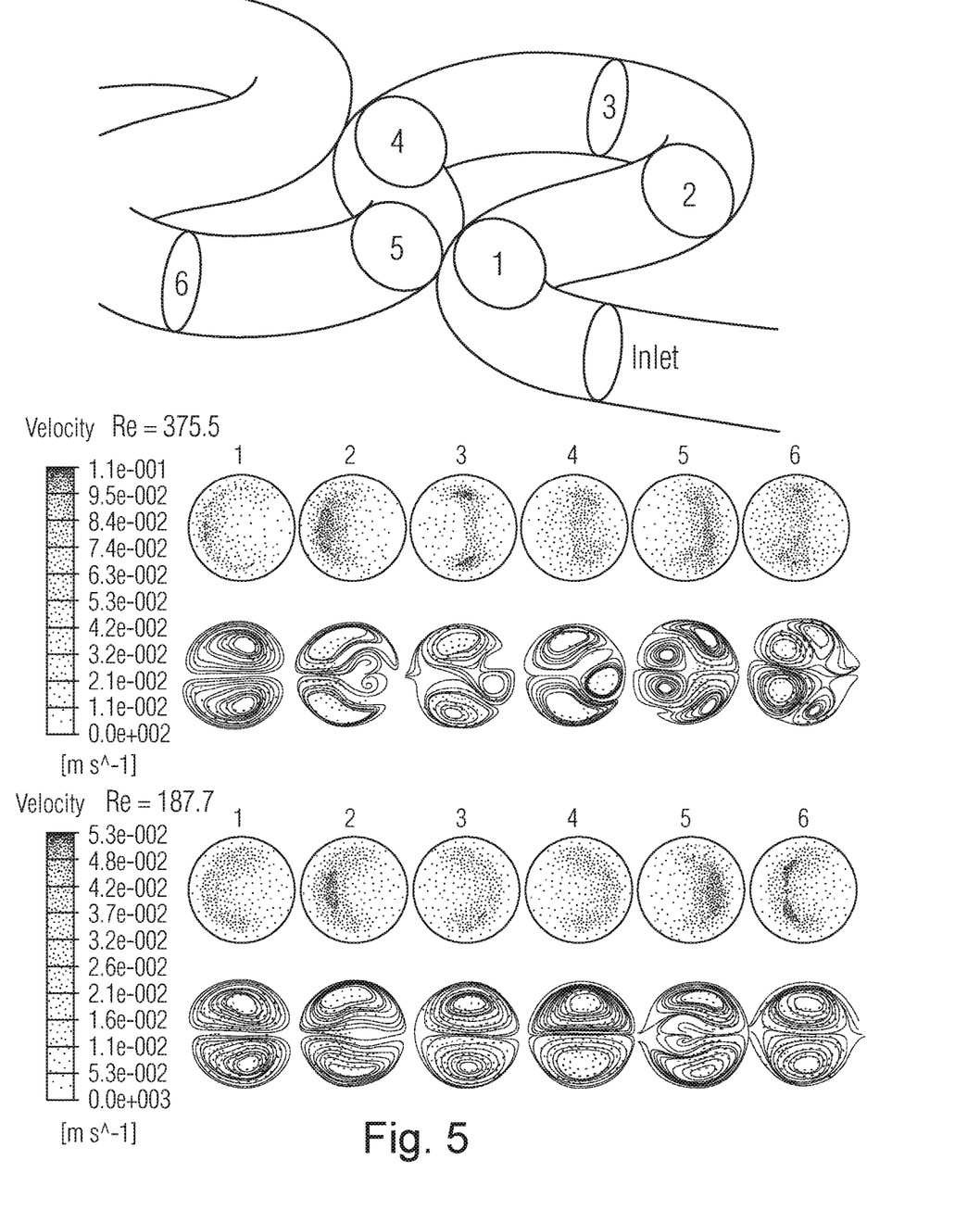
FIG. 5 illustrates the computational fluid dynamics analysis of the cross-sectional velocity contours and secondary flow patterns for the continuous tubular reactor at two flow rates, according to an example of the present disclosure.

For a more comprehensive evaluation of the JIB flow dynamics, the cross-sectional axial velocity contours and streamline patterns of the secondary flows were computationally evaluated at Re 187.7 and 375.5 (FIG. 5). In FIG. 5, images of the cross-sectional velocity and secondary flow streamline patterns at turn centers and before and after flow inversion points show that the velocity profile and secondary flow pattern is highly unstable due to the flow path curvature and flow inversions. The secondary flow lines are symmetrical as the fluid reaches the center of the entrance turn and are then gradually more disordered, breaking up into uneven regions of swirling patterns, as the flow moves through the reactor, this effect is more pronounced at higher Re, as seen in FIG. 5. This non-symmetrical behavior of the secondary path lines is expected with larger values of Dean Number (D>100) where the pressure differential is greater on the outside of the bend and thus the secondary flow has convected the axial momentum peak well away from the center of the cross-section.

Flow inversions change the direction of secondary flows and thus the location of the axial momentum peak, or maximum velocity, as seen in FIG. 5 for both Re 187.7 and 375.5. The midpoint of the momentum peak shift from one side of the channel to the next occurs at the center of the alternating 270° turns, as shown in FIG. 5 top and bottom sections 3 and 6. The cross-sectional velocity contours in FIG. 5 show that at this midpoint the region of maximum velocity is partitioned vertically, creating two peak velocity regions at the upper and lower halves of the channel, indicative of radial mixing.

As shown previously in the velocity profiles plotted in FIG. 4 at position 3, as the flow approaches the turn inflection point (FIG. 5 section 4) the maximum velocity decreases to approximately 0.041 and 0.079 m/s for Re 187.7 and 375.5, respectively. These values are 22% and 24.9% lower than characteristic maximum velocities for laminar flow at both Re values, respectively. Thus, the curvature of the flow path not only induces radial mixing, but also reduces the cross-sectional maximum velocity, both of these factors are critical to narrowing the RTD of the JIB.

Residence Time Distribution Results

Figure 6:
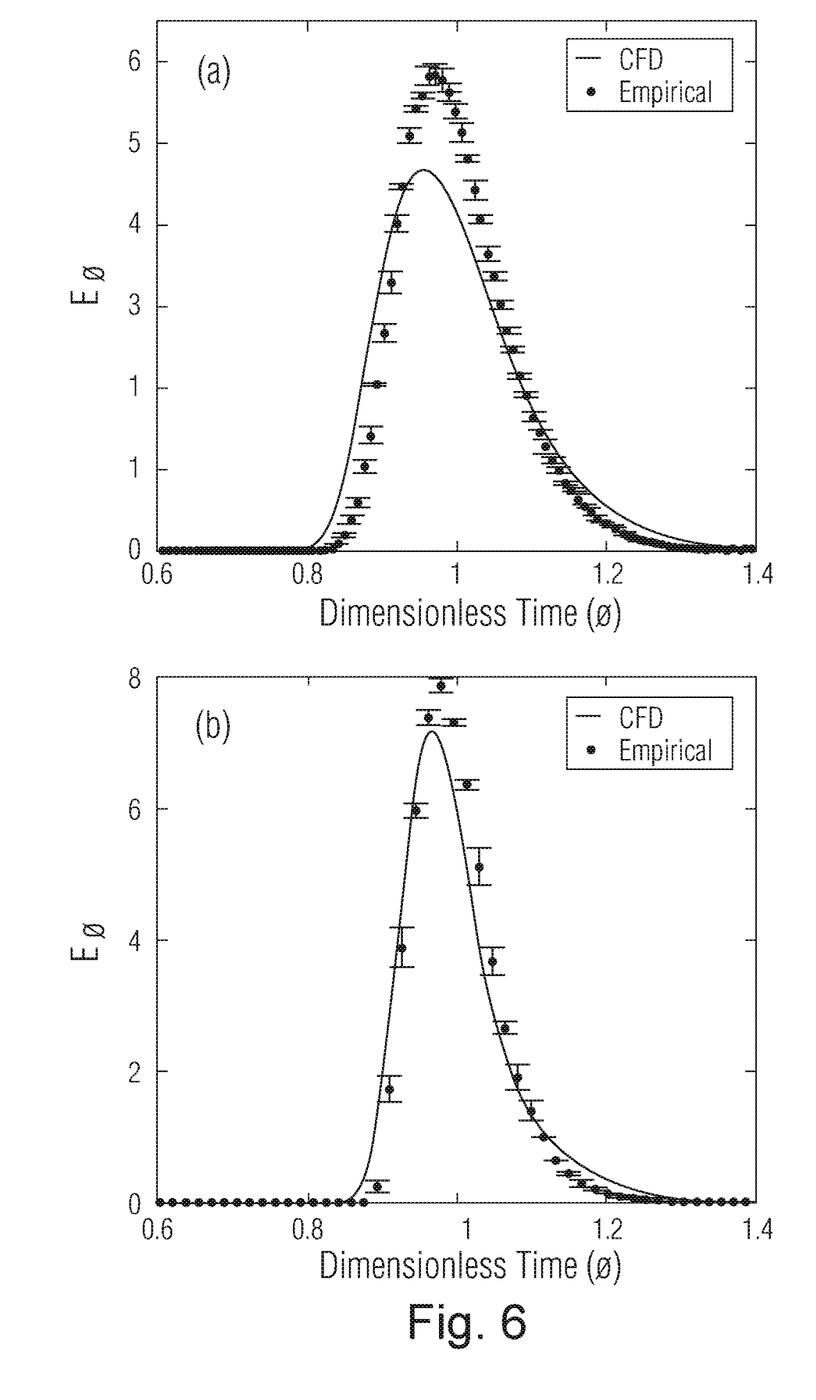
FIG. 6 is a comparison of CFD Model and tracer study dimensionless E(θ) Residence Time Distribution (RTD) curves for a continuous viral inactivation reactor at two flow rates, according to an example of the present disclosure.

CFD tracer RTD simulations were conducted to predict the characteristic axial dispersion and minimum residence time (MRT) of the JIB before construction and were subsequently validated experimentally. These CFD simulations and experimental data were generated for a JIB length of 16.43 m containing 325 alternating 270° turns. The MRT is the time when the first tracer fluid element exits the reactor, $$F = \int_0^0 E_0 d\theta = \int_0^t E(t)dt$$

approximated as the time when the F curve, cumulative distribution curve, described by Equation is equal to 0.005 ($F_{0.005}$). The dimensionless E curves for the experimental and CFD Model were plotted for comparison, as shown in FIG. 6, at 50 and 100 ml/min (Re 187.7 and 375.5). The empirical data was generated by averaging the results of three experimental runs for each flow rate.

To quantitatively determine the accuracy of the CFD model the variance ($\sigma 2$), dimensionless variance, dimensionless minimum residence time ($\theta 0.5\%$), dimensionless maximum residence time ($\theta_{99.5}\%$), relative width, mean residence time, and MRT values were computed and compared with the empirical values for two flow rates, 50 and 100 ml/min, as shown in Table 1. The variance values generated by the CFD model at 50 and 100 ml/min are within 11 and 15.8% of the experimental results, respectively, as shown in Table 1. The $R_w$ of the CFD model at 50 and 100 ml/min was within 8.6 and 10.1% of the experimental data respectively. For 50 and 100 ml/min, the CFD model predicted MRTs of 9.15 and 4.83 min which is within 4.9 and 3.6% of the experimental values of 9.62 and 5.01 min, respectively, Table 1. Thus, the CFD model performed with good accuracy, predicting the JIB MRT and RTD variance within 4.9 and 15.8% for our operating range of 50-100 ml/min.

causing a radial pressure gradient. Thus, the pressure drop in the JIB used in the examples was greater than that of a straight pipe of the same length. The design objective here was to restrict the pressure drop value to a maximum of 5 psi. Pressure loss in the viral inactivation step would add to the overall pressure burden in the continuous downstream process, specifically impacting in-line chromatography steps which are highly sensitive to pressure. The pressure at varying JIB lengths from 16.43 to 148.5 m, corresponding to 1-9 JIBs (520 ml units), was measured experimentally with water at 50, 100, and 150 ml/min. The pressure values for 9 JIBs at 50, 100, and 150 ml/min (Reynolds numbers 187.7, 375.5, and 563.2) were 0.74, 1.9, and 3.44 psi, respectively. This is 64%, 110%, and 154% higher than the theoretical values of 0.451, 0.902, 1.353 psi for a straight tube under the same conditions, calculated via the Hagen-Poiseuille law. Demonstrating that while the curvature increases mixing in the system, it also contributes to a substantial increase in the pressure drop and this effect is more pronounced at higher flow rates. However, within our operating range of 50-100 ml/min the pressure drop is below 5 psi for lengths that provide 60 min incubation times, which corresponds to approximately 66 m and 0.45 psi to 214.5 m and 2.8 psi, respectively.

Scaling Results

Figure 7A:
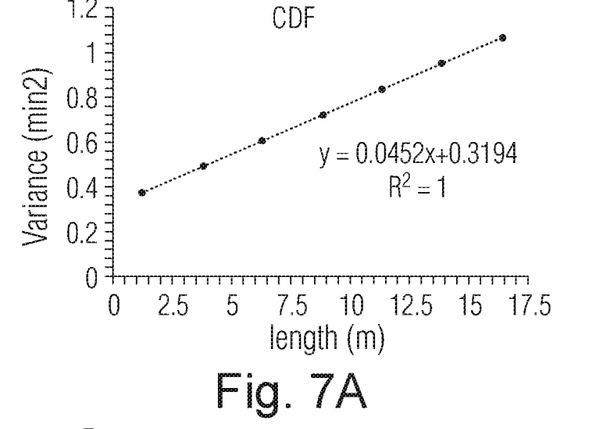
FIGS. 7A-7C illustrate scaling of the continuous tubular reactor with a length at a predetermined flow rate, according to an example of the present disclosure.
Figure 7B:
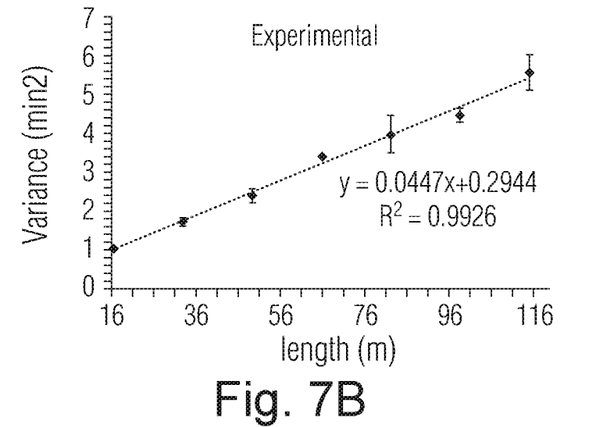

To determine how the JIB RTD and MRT scales with length, surface monitors were placed at intervals along the JIB flow path of the CFD model to measure the simulated RTDs at 50 ml/min. As shown in FIG. 7A, the CFD model predicted a linear relationship of length versus variance with a slope of 0.0452. For experimental validation of the CFD model, pulse tracer experiments were conducted for JIBs connected in series, as shown in FIG. 2d, from 1 to 7 units, or 16.43 to 115 m, which consist of 325-2275 (270°) turns, at 50 ml/min or Re 187.7. As shown in FIG. 7, the experimental results demonstrated a linear relationship between length and variance with a slope of 0.0447, shown in FIG. 7B. The CFD model slope was within 1.12% of experimental value. This shows the CFD model can be used to accurately predict the RTD and MRT of the JIB at various lengths.

Figure 7C:
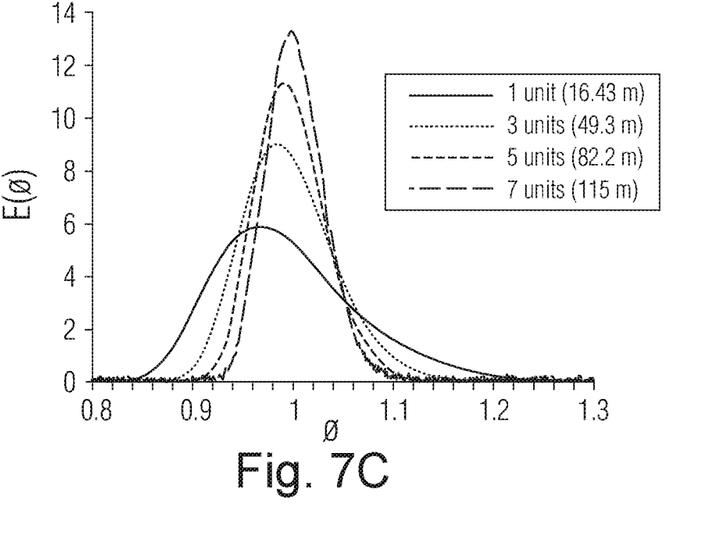

Additionally, the dimensionless RTD curves, plotted in FIG. 7C, show the profile becomes more symmetrical and tighter about the mean residence time ($\theta=1$) as the reactor length increases, indicating a smaller deviation from plug flow with increasing JIB length. This convergence toward plug flow with increasing length is possibly due to tracer elements sampling more radial positions, and therefore more

TABLE 1

Experimental data and CFD Model Comparison of the JIB RTD characteristic values of the dimensionless variance ($\sigma^2_\theta$), dimensionless minimum residence time ($\theta_{0.5\%}$), dimensionless max residence time ($\theta_{99.5\%}$), relative width, and minimum residence time at 50 and 100 ml/min

| Flow rate | Source | Variance, $\sigma 2$ (min$^2$) | Variance, $\sigma^2_\theta$ | $\theta_{0.5\%}$ | $\theta_{99.5\%}$ | $R_w$ | $t_{mean}$ (min) | MRT, $t_{min}$ (min) |
|---|---|---|---|---|---|---|---|---|
| 50 ml/min (0.0263 m/s) | CFD | 1.09 | 8.96E–03 | 0.831 | 1.317 | 0.631 | 11.01 | 9.15 |
| | Experimental | 1.06 ± 0.1 | 8.32E–03 | 0.877 | 1.280 | 0.685 | 11.27 ± 0.01 | 9.4 ± 0.1 |
| 100 ml/min (0.0526 m/s) | CFD | 0.16 | 5.39E–03 | 0.877 | 1.280 | 0.685 | 5.51 | 4.83 |
| | Experimental | 0.19 ± 0.01 | 3.18E–03 | 0.876 | 1.149 | 0.762 | 5.72 ± 0.01 | 5.01 ± 0.3 |

Pressure Drop in JIB Results

In curved pipes, the resistance to flow is greater than in straight pipes due to the outward forces acting on the fluid velocity profiles, causing each tracer element to approach the same mean velocity. This means that the extra volume needed beyond the ideal plug flow volume (where $t_{min} = t_{mean}$) decreases with increasing length. Thus, the smallest volume plug flow reactor would be one that has the maximum length allowed given the pressure limitations imposed. One can envision optimizing tube diameter, the diameter of curvature, and the length for different flow rates to achieve the maximum allowable pressure, to achieve the plug flow reactor with the smallest volume. Even so, the current design is close enough to optimal for the flow rates tested. The $t_{min}$ is only 15% smaller than the $t_{mean}$ (see Table 1). Thus, further reduction in JIB volume is not warranted. Additionally, the MRT for 7 units or JIB reactor length of 115 m, determined from experimental data as shown in the dimensionless form in FIG. 7, was 70.4±0.46 min, only 2.44 min from the plug flow value of 72.84 min for the same volume (Experimental volume 3,642 ml) at the same 50 ml/min flow rate, where plug flow is the V/Q, where V is volume and Q is flow rate.

Conclusion from Example

A continuous flow tubular reactor, the JIB, for continuous low pH viral inactivation, was designed, evaluated using computational fluid dynamics, and 3D printed for experimental validation. The JIB design requirements were generated with the goal of limiting the reactor pressure drop and streamline integration into the downstream purification process: ii) a ≤5 psi pressure drop along the length of the tube, (ii) achieve radial mixing to minimize axial dispersion without moving parts, and (iii) operate at the laminar flow regime. Additionally, a minimum residence time (MRT) approach was used to ensure that the desired product holding time was met.

The flow path of the JIB was designed in a serpentine pattern with alternating 270° turns. The CFD model was used to study and quantify the effect of the dean vortices generated by the curved JIB flow path geometry on the RTD. CFD model results showed that the curvature in the flow path resulted in the generation of dean vortices and confirmed that changes in the flow direction disrupted the velocity profile. These secondary flows and momentum shifts in the velocity profile are indicative of passive mixing and consequently lead to reduced axial dispersion and narrow the RTD when compared to laminar flow in a straight pipe of the same length. The CFD model accuracy was demonstrated quantitatively comparing the experimental and computational values for the variance ($\sigma^2$), dimensionless MRT ($\theta_{0.5\%}$), and dimensionless maximum residence time ($\theta_{99.5\%}$). The variance values were within 15.8% accuracy between the model and the experimental data.

The CVI reactor, JIB, was characterized in terms of flow dynamics, pressure drop, and RTD at a range of flow rates. The design is compact, flexible, modular, and scalable, which allows for easy process integration. The RTD curves show a close to plug flow behavior and the MRT is easily determined via the F curve response and can be predicted using a CFD model.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

The scope of this disclosure is to be broadly construed. It is intended that this disclosure disclose equivalents, means, systems, and methods to achieve the devices, activities and mechanical actions disclosed herein. For each device, article, method, mean, mechanical element or mechanism disclosed, it is intended that this disclosure also encompass in its disclosure and teaches equivalents, means, systems, and methods for practicing the many aspects, mechanisms and devices disclosed herein. Additionally, this disclosure regards a coating and its many aspects, features, and elements. Such a device can be dynamic in its use and operation, this disclosure is intended to encompass the equivalents, means, systems, and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A viral inactivation device comprising:
    at least one continuous viral inactivation reactor including an inlet, an outlet, and a tubular flow path comprising a set of alternating turns that form a serpentine pattern between the inlet and the outlet;
    wherein the tubular flow path includes a diameter of from 0.6 cm to 0.7 cm;
    and
    wherein the set of alternating turns are segmented vertically into at least two stacked layers, wherein each of the at least two stacked layers include a thickness of from 0.7 cm to 1.2 cm.

2. The device of claim 1, wherein the at least one continuous viral inactivation reactor is an in-line tubular continuous viral inactivation reactor.

3. The device of claim 1, wherein the set of alternating turns comprises at least two alternating turns having an angle of from 270° to 280°.

4. The device of claim 1, wherein the set of alternating turns comprises from 2 to 325 or more alternating turns having an angle of from 270° to 280°.

5. The device of claim 1, wherein each of the at least two stacked layers comprises 12.5 alternating turns in a single plane, wherein each of the alternating turns includes an angle of from 270° to 280°.

6. The device of claim 1, wherein each of the at least two stacked layers is connected to one another via a 180° turn of the tubular flow path.

7. The device of claim 6, wherein the at least two stacked layers are 26 layers connected to one another via 25 180° turns of the tubular flow path.

8. The device of claim 1, wherein the at least one continuous viral inactivation reactor comprises from 2 to 6 viral inactivation reactors connected in series.

9. The device of claim 1, wherein the set of alternating turns is arranged to generate a vortex to induce mixing a product stream having a laminar flow with a Reynolds Number of from 187.7 to 375.5.

10. The device of claim 1, wherein the tubular flow path includes dimensions such that a product stream is in the continuous viral inactivation reactor for at least 30 minutes.

* * * * *